United States Patent
Chen

[19]

[11] Patent Number: 5,938,352
[45] Date of Patent: Aug. 17, 1999

[54] KEYBOARD CASING WITH A WRIST PAD

[75] Inventor: Frank Chen, Taipei, Taiwan

[73] Assignee: Silitek Corporation, Taipei, Taiwan

[21] Appl. No.: 09/034,942

[22] Filed: Mar. 5, 1998

Related U.S. Application Data

[63] Continuation-in-part of application No. 08/555,205, Nov. 8, 1995, abandoned.

[51] Int. Cl.[6] ...................................................... B41J 5/08
[52] U.S. Cl. ........................... 400/472; 400/691; 400/715; 248/118
[58] Field of Search ................................ 248/118, 118.1; 341/22; 345/168; 361/680; 400/472, 691, 715; D14/114, 115

[56] References Cited

U.S. PATENT DOCUMENTS

| | | |
|---|---|---|
| D. 303,249 | 9/1989 | Bratasevec . |
| D. 362,432 | 9/1995 | Paull et al. . |
| D. 368,902 | 4/1996 | Shen et al. . |
| D. 372,911 | 8/1996 | Wang et al. . |
| 5,074,413 | 12/1991 | Ikata et al. . |
| 5,203,527 | 4/1993 | Rubley . |
| 5,244,296 | 9/1993 | Jensen . |
| 5,443,320 | 8/1995 | Agata et al. . |
| 5,451,020 | 9/1995 | Smith et al. . |
| 5,503,484 | 4/1996 | Louis . |
| 5,610,602 | 3/1997 | Hargreaves . |
| 5,660,360 | 8/1997 | Yang ........................................ 400/715 |
| 5,739,776 | 4/1998 | Chen ........................................ 400/488 |
| 5,826,839 | 10/1998 | Chen ........................................ 400/472 |

FOREIGN PATENT DOCUMENTS 0 654 727  5/1995  European Pat. Off. .

*Primary Examiner*—Ren Yan
*Attorney, Agent, or Firm*—Browdy and Neimark

[57] ABSTRACT

A keyboard casing including a bottom shell, and a cover shell covered on said bottom shell to hold a set of key switches, the bottom shell having a wrist pad integrally molded on the front side thereof for resting the wrists of the hands.

6 Claims, 3 Drawing Sheets

KEYBOARD CASING WITH A WRIST PAD

This application is a continuation-in-part application of U.S. application Ser. No. 08/555,205 filed Nov. 8, 1995, now abandoned.

BACKGROUND OF THE INVENTION

The present invention relates to the casing of a computer keyboard, and relates more particularly to a keyboard casing which has a wrist pad integrally molded on the front side of the bottom shell for resting the wrists of the hands.

PRIOR ART

The prior art discloses a computer keyboard having a wrist pad at the front side for resting the wrists of the hand so that the operator can comfortably operate the keyboard for a length of time without causing any pain. This wrist pad is integrally made on the front side of the cover shell of the casing of the keyboard. The cover shell is injection-molded from plastics. Because the wrist pad is integrally molded on the front side of the cover shell, the cover shell and the wrist pad must be made from the same material in the same color. To provide the wrist pad with a color different from that of the cover shell, an extra coat-painting process must be employed. Another drawback of this structure of computer casing is that the presence of the wrist pad on the cover shell complicates the assembly process of the computer casing.

SUMMARY OF THE INVENTION

The present invention has been accomplished to provide a keyboard casing with a wrist pad which eliminates the aforesaid drawbacks. According to the present invention, the wrist pad is integrally molded from the front side of the bottom shell of the computer shell and disposed in a flush manner with the top side of the cover shell. Because the wrist pad is molded on the bottom shell, it can be made from a different material in a different color relative to the cover shell of the computer casing.

DETAILED DESCRIPTION OF THE PREFERRED EMBODIMENT

Figure 1:
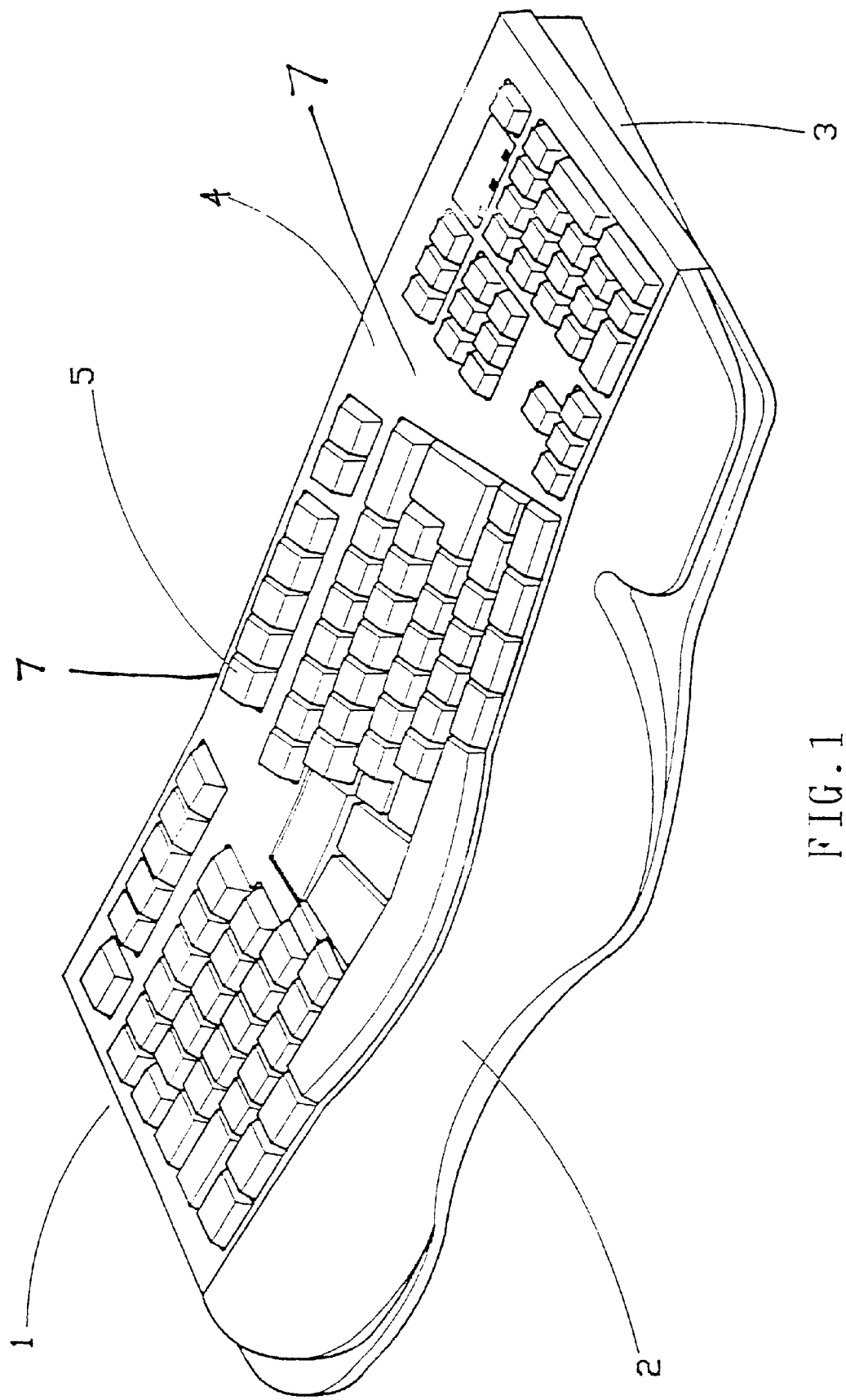
FIG. 1 is an elevational view of a keyboard casing according to the present invention.
Figure 2:
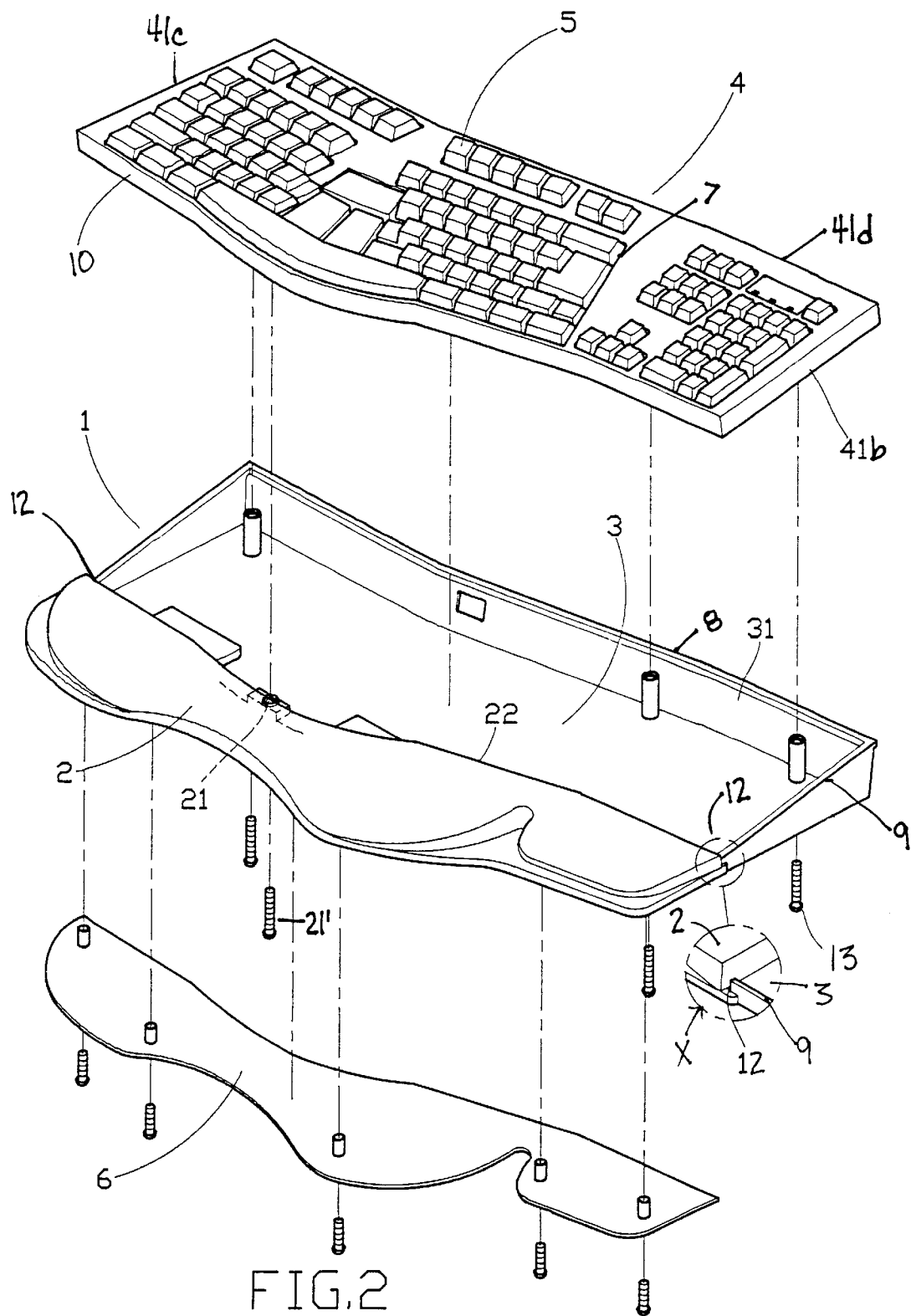
FIG. 2 is an exploded view of the keyboard casing shown in FIG. 1.

Referring to FIGS. 1 and 2, a keyboard casing 1 in accordance with the present invention has a bottom shell 3 with an integral wrist pad 2 at the front side, a cover shell 4 with sides walls 41b and 41c, a front side wall 10 and a back side wall 41d. The side walls 41b, 41c and back side wall 41d are mounted on over the back and side walls (8, 9) of the bottom shell 3 so that side walls 41b, 41c and back sidewall 41d of cover shell 4 engage the plane of side walls (8, 9) of bottom shell 3 and hold a set of key switches 5 in openings 7 in cover shell 4. Further, the front side wall 10 of the cover shell 4 engages the bottom shell in the vicinity of the front side wall 11 of the bottom shell 3 and is held against front side 11 through engagement in longitudinal slot 12.

Figure 3:
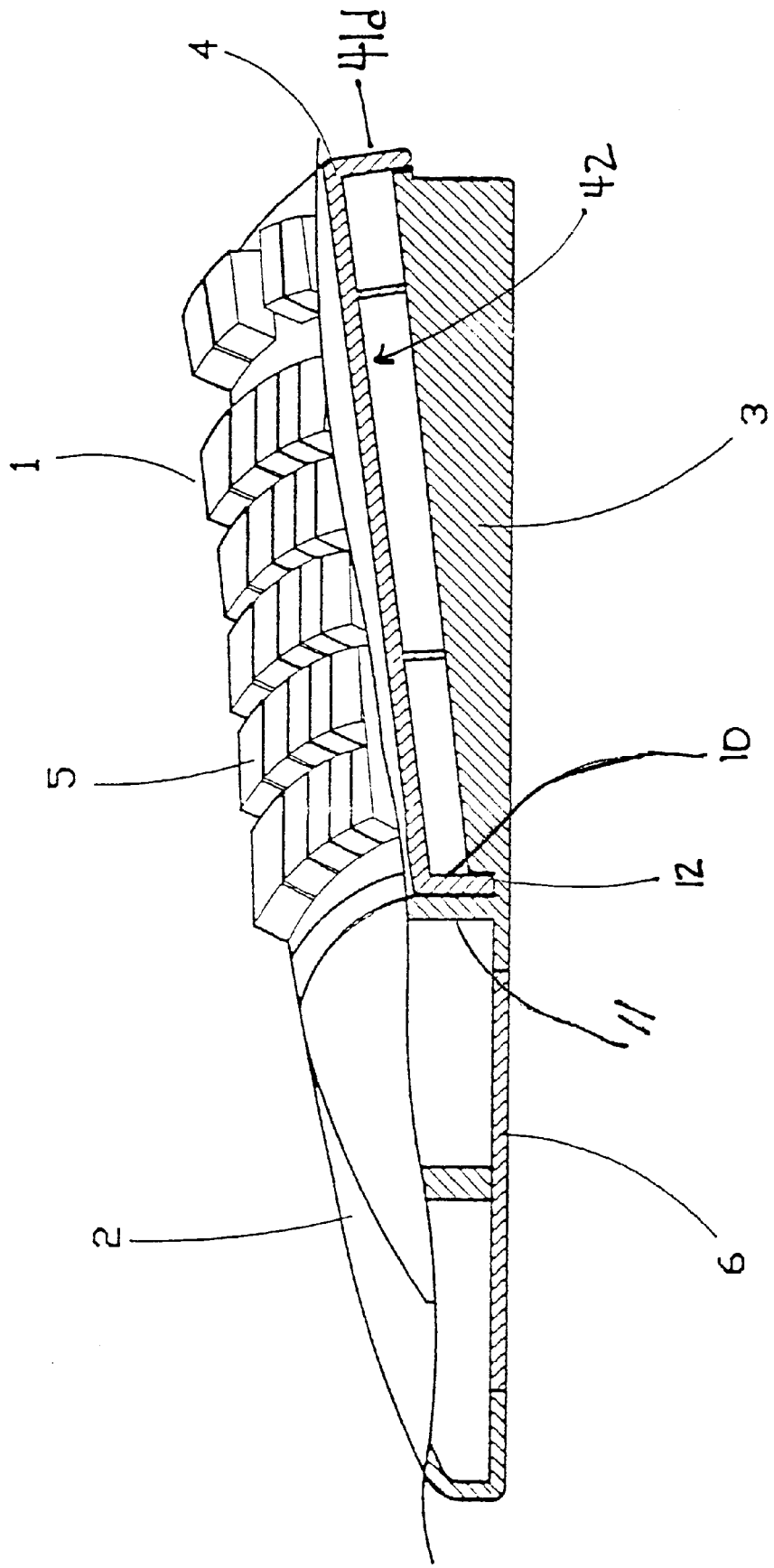
FIG. 3 is a side view, partially in section, of the keyboard casing shown in FIG. 1.

As shown in circle "X" on FIG. 2 and on FIG. 3, slot 12 is provided between side walls 9 of the bottom shell 3 and wrist pad 2 on bottom shell 3. The front side wall 10 is inserted in slot 12 to engage front side 11 of bottom shell 3. Side wall 10, 41b, 41c and 41d around cover shell 4 serve to form a concave space 42 within cover shell 4. Screw 21' which is placed through hole 21 engages the cover shell 4 on the keyboard casing 1. In this position, front side wall 10 of the cover shell 4 is engaged to connective bridge 22 of wrist pad 2, and fixed in slot 12. At the same time all the side walls 41b, 41c and 41d of the cover shell are outside the frame 31 of the keyboard casing 1 so that the cover shell 4 covers the keyboard casing 1. As noted, cover shell 4 is fastened to keyboard casing 1 by screws including a screw through lockhole 21.

Referring to FIG. 3, the wrist pad 2 is integrally molded on the front side of the bottom shell 3 above the bottom side of the bottom shell 3. The bottom board 6 is fastened to the bottom side of the wrist pad 2 by screws. When installed, the bottom side of the bottom board 6 is disposed flush with the bottom side of the bottom shell 3. Because the wrist pad 2 is integrally molded on the front side of the bottom shell 3, the color and material of the bottom shell 3 with the wrist pad 2 can be selectively made free from the limitation of that of the cover shell 4.

It is to be understood that the drawings are designed for purposes of illustrations only, and are not intended as a definition of the limits and scope of the invention disclosed.

What is claimed is:

1. A keyboard casing comprising a bottom shell having side walls and a back wall, said bottom shell side walls extending from said bottom shell back wall to a longitudinal slot, cover shell having side walls and a back side wall respectively mounted on and engaged to said bottom shell side walls and said bottom shell back wall, a front side wall of the cover shell engaged in said longitudinal slot, and said cover shell holding a set of key switches in openings in said cover shell, wherein said bottom shell has a wrist pad molded with a front side of the bottom shell as a fixed unit with the bottom shell for resting the wrists of the operator's hands.

2. The keyboard casing of claim 1, wherein the front side wall of said cover shell engages a front side of the bottom shell when said front side wall of said cover shell is engaged in said longitudinal slot.

3. The keyboard casing of claim 1, wherein said cover shell caps corners of said bottom shell side walls and said bottom shell back wall to further stabilize said cover shell on said bottom shell.

4. The keyboard casing of claim 1, wherein said bottom shell is fixed to said cover shell by a screw from a bottom of said bottom shell through a through hole in said bottom shell into said cover shell.

5. The keyboard casing of claim 1, wherein each of said bottom shell and said cover shell are molded from a plastic having a different color.

6. The keyboard casing of claim 1, wherein a top edge of the front side wall of the cover shell is below a top edge of the front side of the bottom shell.

* * * * *